US005641093A

United States Patent [19]

Dolin et al.

[11] Patent Number: 5,641,093

[45] Date of Patent: Jun. 24, 1997

[54] METHOD FOR DISPENSING PHARMACEUTICALS

[76] Inventors: Lisa M. Dolin; Mark D. Allen, both of c/o Cardinal Health, Inc. 655 Metro Pl. South, Dublin, Ohio 43017

[21] Appl. No.: 546,584

[22] Filed: Oct. 23, 1995

[51] Int. Cl.[6] .......... B65G 59/00

[52] U.S. Cl. .......... 221/282; 312/184

[58] Field of Search .......... 221/45, 282; 206/449, 206/528, 806; 312/184, 330.1; 211/44, 123

[56] References Cited

U.S. PATENT DOCUMENTS 4,717,215 1/1988 Everts .......... 312/184
5,456,369 10/1995 Smed .......... 312/184

*Primary Examiner*—Kenneth Noland
*Attorney, Agent, or Firm*—Kremblas, Foster, Millard & Pollick

[57] ABSTRACT

A method for assisting in the dispensing of pharmaceuticals is provided including the steps of: (1) determining what pharmaceutical needs to be restocked; (2) selecting a pharmaceutical distribution container corresponding to the pharmaceutical needing to be restocked, with the container including a tray and a sleeve. The tray has a base, a sidewall, and pharmaceutical retaining means within the tray, with such pharmaceutical retaining means including a rod, with the rod having a first and a second end and packets containing one each of the pharmaceutical needing to be restocked; (3) removing the tray from the sleeve; (4) removing the rod from the tray; and (5) transferring a predetermined number of packets from the rod to a restocking cart so the packets can be restocked.

17 Claims, 5 Drawing Sheets

METHOD FOR DISPENSING PHARMACEUTICALS

FIELD OF THE INVENTION

This invention concerns a method for dispensing pharmaceuticals and more specifically a method utilized in a drug retrieval system, which system is robotic.

BACKGROUND OF THE INVENTION

An important aspect of health care concerns the cost-effective distribution of pharmaceuticals. This is especially important in settings such as hospitals, where the pharmaceuticals for a large number of patients are commonly dispensed from a central pharmacy housed within the hospital. Hospitals typically employ a number of pharmacists and pharmacy technicians to personally oversee the hospital's pharmacy. Additionally, a relatively large inventory is kept on hand due to the rapid depletion of stock. Obviously, employing several individuals to do a job which is associated with sporadic activity is subject to review in the face of what some view as spiraling health care costs. Additionally, freeing pharmacists to spend more of their time with doctors and patients improves the quality of the health care provided.

Concerns about the increasing cost of health care have lead to the introduction of automated drug retrieval systems, some of which systems utilize robotics. There are several advantages associated with the use of robotics. First, there are the obvious savings in salaries, since the jobs associated with some individuals can be replaced with machines. Second, there is a greater reliability associated with robotics that incorporate bar code scanning which select an item for retrieval as opposed to the possibility of human error in reading the item to be retrieved. This significantly reduces the potential for pharmacy malpractice. Third, there is the elimination of product being misappropriated from a storage area by individuals for their own subsequent use or resale. Fourth, it improves the billing process. Fifth, it permits the establishment of an electronic medical record. Sixth, it simplifies the health care process through the elimination of paperwork.

In one example of an existing robotic drug retrieval system, or a robotic medication dispensing systems as they are also known, the pharmaceutical to be retrieved/dispensed is typically placed inside a sealed plastic bag in unit doses for subsequent scanning and selection. The robotic drug retrieval system has as part of a hospital's central pharmacy a secured area having two opposing walls with pegs thereon and with a robot which circulates within this area. As a pharmacy technician loads a pharmacy cart for the distribution of pharmaceuticals to various patients, the technician in a robotic drug retrieval system utilizes a patient tray having affixed thereto bar codes identifying the name of particular patients and their locations within the hospital. The robotic drug retrieval system thereafter selects the specific drugs required to be delivered to a particular patient and puts them into the patient tray, and provides the filled tray to the pharmacy technician for subsequent distribution to the patient. Once the sealed plastic bags have been removed from their corresponding pegs on the walls by the robot, it becomes necessary to restock that distribution area. In order for this to be done, the robot must place new bags on the pegs.

The new bags come from a restocking source. Typically, the restocking source is a cart having at least one wall portion with pegs similar to those on the wall of the distribution area. Due to concerns about excess inventories created as a result of the large runs required to generate economies of scale, it would be advantageous for the restocking source to not be excessively large, as far as the number of bags of a given pharmaceutical associated with the restocking source. Also, due to concerns about costs, it is important for an accurate record to be kept relative to the inventory restocked. An important aspect of this is that an accurate number of bags be provided for the actual restocking process. These concerns have not been addressed in pre-existing drug retrieval systems.

It is thus apparent that the need exists for an improved method for the dispensing of pharmaceuticals, especially those pharmaceuticals which are dispensed by robotic drug retrieval systems.

SUMMARY OF THE INVENTION

The problems associated with developing a method for dispensing pharmaceuticals as part of a robotic drug retrieval system are overcome in accordance with the present invention by a method for assisting in the dispensing of pharmaceuticals, with the method including the steps of: (1) determining what pharmaceutical needs to be restocked; (2) selecting a pharmaceutical distribution container corresponding to the pharmaceutical needing to be restocked, with the container having a tray and a sleeve, and with the tray having a base, a sidewall, and means for retaining pharmaceuticals within the tray, with such means for retaining pharmaceuticals within the tray including a rod, with the rod having a first and a second end and packets containing one each of the pharmaceutical needing to be restocked; (3) removing the tray from the sleeve; (4) removing the rod from the tray; and (5) transferring a predetermined number of packets from the rod to the restocking cart.

The sleeve of the container thus encases the tray. Furthermore, the sleeve has a top surface, a bottom surface, and two end faces. The end faces of the sleeve each have a top edge and a bottom edge with the distance between the top edge of each of the end faces being greater than the distance between the bottom edge of each of the end faces. Still further, with respect to the packets, each of them has an aperture formed therethrough. The packets are arranged in groups of ten with dividers sometimes placed between each group.

The sidewall includes a first sidewall portion, a second sidewall portion, a third sidewall portion, and a fourth sidewall portion. In the preferred embodiment of the tray used with the method of this invention, the first and third sidewall portions have the same dimensions, and said second and fourth sidewall portions have the same dimensions. In the preferred embodiment of the tray, each of the first and third sidewall portions have a recessed portion formed therein.

The rod is capable of being secured between the first sidewall portion and the third sidewall portion, with the ends of the rod terminating in the two recessed portions. Furthermore, each of the first, second, third, and fourth sidewall portions is of a trapezoidal shape.

Additionally, each of the first, second, third and fourth sidewall portions have a top edge and a bottom edge with the distance between the first sidewall portion top edge and the third sidewall portion top edge being greater than the distance between the first sidewall portion bottom edge and the third sidewall portion bottom edge. Furthermore, preferably the distance between the second sidewall portion top edge and the fourth sidewall portion top edge is greater than the distance between the second sidewall portion bottom edge and the fourth sidewall portion bottom edge.

The method includes the additional step of replacing the rod in the tray following the removal from the rod of a predetermined number of packets. With respect to the rod, a first end of the rod has a first end cap and a second end of the rod has a second end cap. The first end cap rests in the recessed portion of the first sidewall portion and the second end cap rests in the recessed portion of the third sidewall portion. The first end cap is preferably fixedly secured to the rod while the second end cap is detachably secured to the rod.

The method of the invention includes the additional step of removing the second end cap prior to removal from the rod of said predetermined number of packets. The method also includes the steps following the easy sliding removal from the rod of the predetermined number of packets of replacing the second end cap on the rod and replacing the rod in the tray. The method further includes the additional step of replacing the tray within the sleeve.

It is the primary object of the present invention to provide a method for assisting in the dispensing of pharmaceuticals, which method is easy to use, and which method makes use of existing technology relating to automated pharmacy systems.

Another objective of the invention is to respond to concerns about materials costs and the concommitant waste costs of the trays and sleeves.

Still another objective is to respond to concerns about the storage space of bagged inventory.

Yet still another objective is to respond to concerns about the labor cost associated with maintaining inventories for restocking.

Other objects and advantages of the invention will be apparent from the following description, the accompanying drawings and the appended claims.

DETAILED DESCRIPTION OF THE INVENTION

Figure 1:
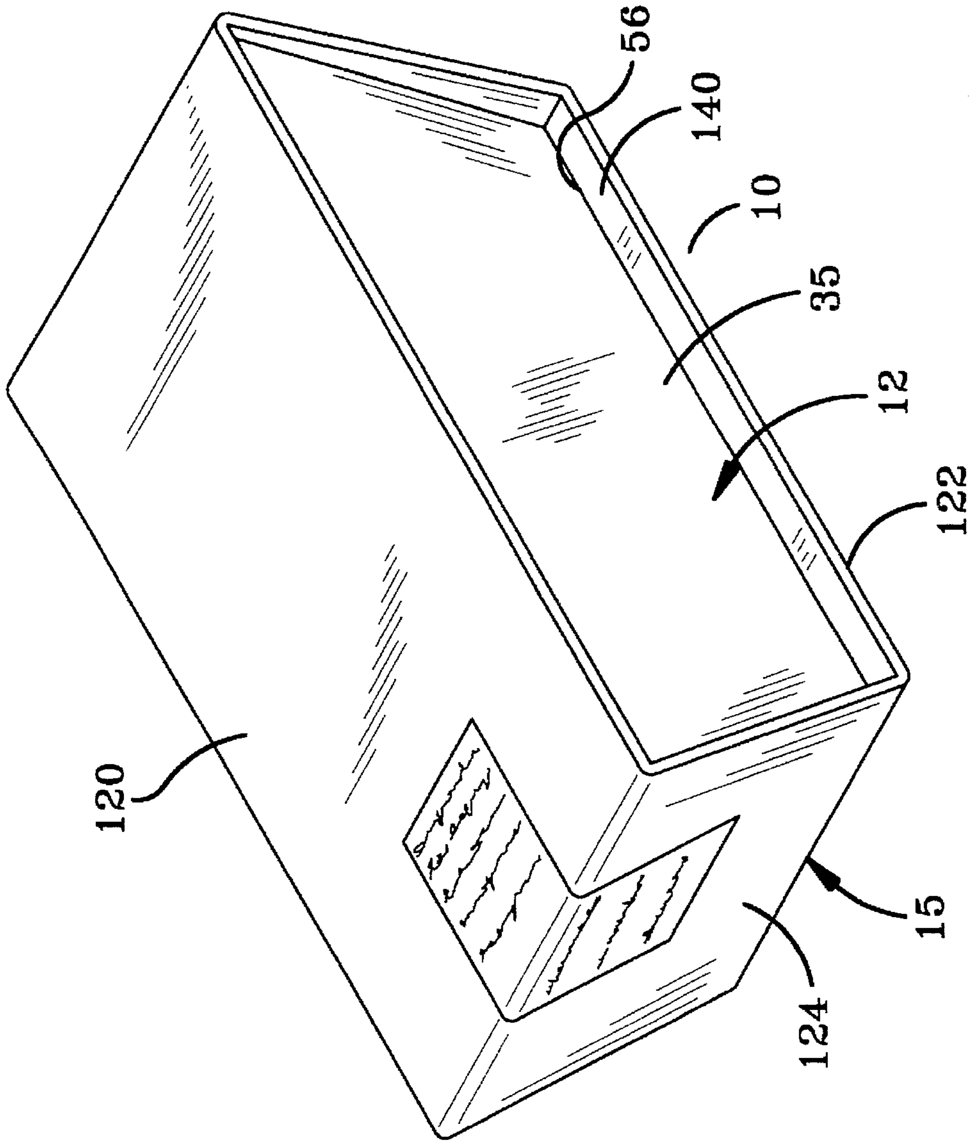
FIG. 1 is a perspective view of a container for use in the method of this present invention.

Having reference to the drawings, attention is first directed to FIG. 1 which discloses a container for use in robotic drug retrieval systems, which container is designated generally by the numeral 10. In comparing FIGS. 1 and 2, it will be observed that container 10 has as its primary components a tray 12 and a sleeve 15. Both of these components in the preferred embodiment of the tray associated with the method of this invention are formed of cardboard of the type found in cardboard boxes, although other materials such as plastic or other paper products could be used.

As can be appreciated from a comparison of FIGS. 1–5 and 7, the tray 12 associated with container 10 is formed with a base 20 and sidewall 23, as well as a pharmaceutical retaining means 25. It will be readily appreciated that base 20 has both an interior surface 26 and an exterior surface 28, both of which in the preferred embodiment of the tray associated with the method of this invention are parallel to one another and planar. Similarly, the sidewall 23 is formed having four planar walls, each of which has both interior and exterior surfaces. First sidewall portion 30 is formed having an interior surface 31 and an exterior surface 32. Second sidewall portion 35 is formed having an interior surface 36 and an exterior surface 37. Third sidewall portion 40 is formed having an interior surface 41 and an exterior surface 42. Finally fourth sidewall portion 45 is formed having an interior surface 46 and an exterior surface 47.

Each of the four sidewall portions, in addition to being planar, are preferably of a trapezoidal configuration. For example, first, second, third and fourth sidewall portions 30, 35, 40 and 45 each have a respective top edge 50, 51, 52 and 53 as well as respective bottom edges 55, 56, 57, and 58. Each top edge is preferably longer in length than the corresponding bottom edge. Additionally, each of the top edges is preferably parallel to the corresponding bottom edge.

In the preferred embodiment of the tray, instead of each of the sidewalls being perpendicular to base 20, each is inclined approximately 7½° from the vertical such that the distance between the top edges 50, 52, of the first and third sidewall portions 30, 40 are spaced a greater distance from one another than the bottom edges 55, 57 of the respective first and third sidewall portions 30,40. Similarly, the top edges 51, 53 of the second and fourth sidewall portions 35, 45 respectively are spaced a greater distance from each other than are the bottom edges 56, 58 of the corresponding second and fourth sidewall portions 35, 45.

Comparing FIGS. 2, 4, 5 and 7 it will be noted that with respect to first sidewall portion 30 and third sidewall portion 40 that each is formed from a much larger wall section which is then folded over to effectively result in a double-wall configuration. Thus, first sidewall portion 30 is formed having a first sidewall first portion 60 and a first sidewall second portion 61 interconnected by top edge 50. Similarly, the third sidewall portion is formed having a third sidewall first portion 65 and a third sidewall second portion 66. This also results in each of the first and third sidewall portions being thicker than each of the second and fourth sidewall portions. Put another way, at least a portion of the thickness of each of said first and third sidewall portions is greater than the thickness of each of said second and fourth sidewall portions.

Figure 2:
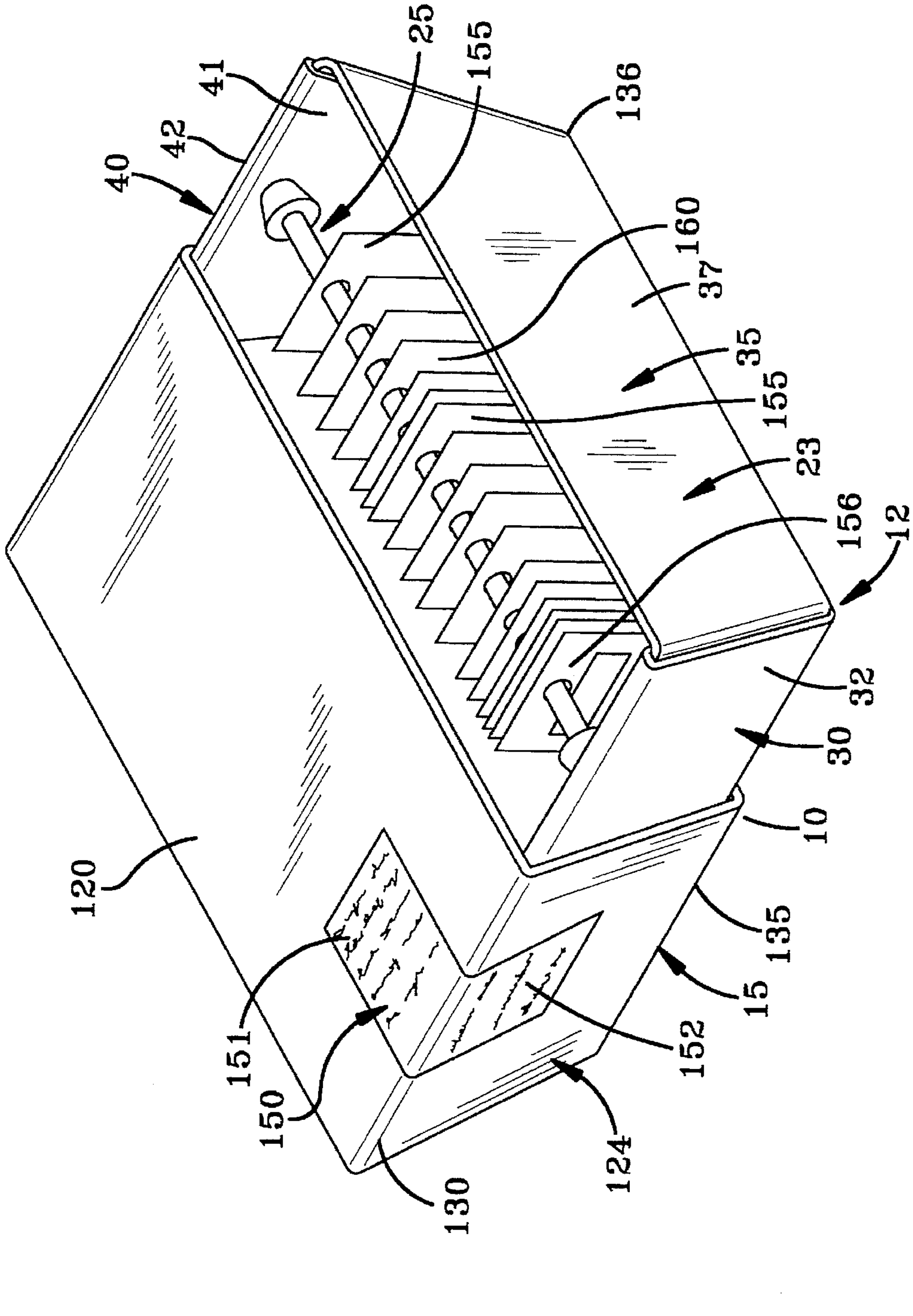
FIG. 2 is a perspective view showing the container partially opened.
Figure 3:
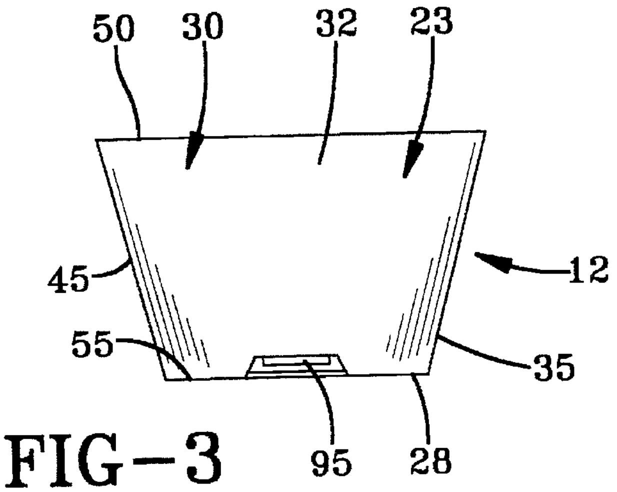
FIG. 3 is front elevational view of the tray component of the container.
Figure 4:
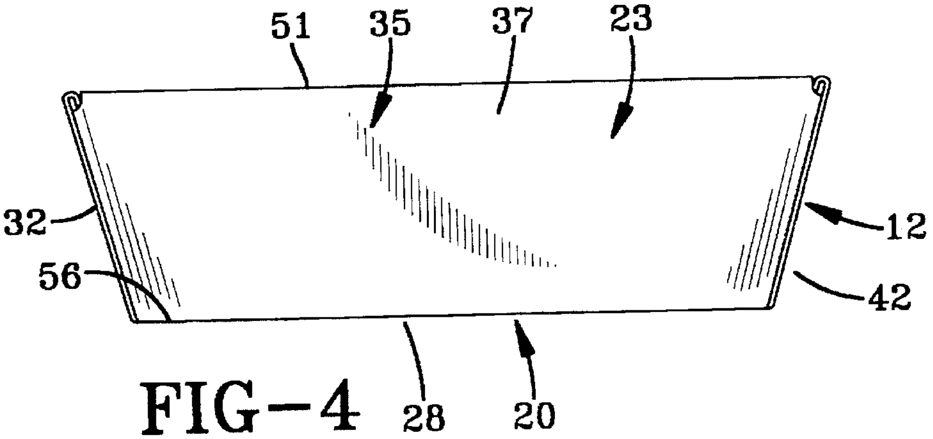
FIG. 4 is a side elevational view of the tray component of the container.
Figure 5:
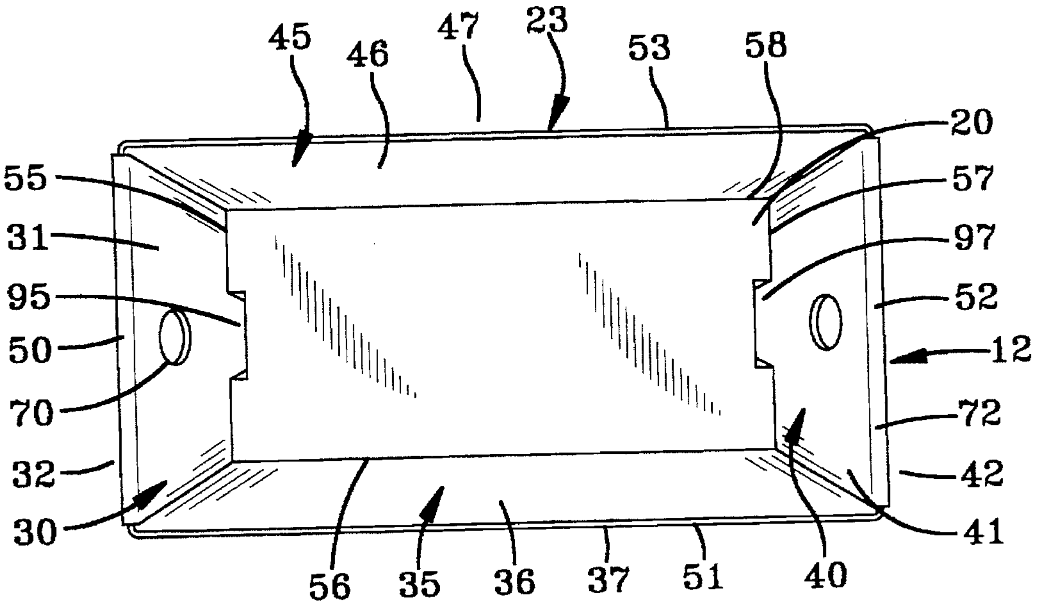
FIG. 5 is a top plan view of the tray.
Figure 7:
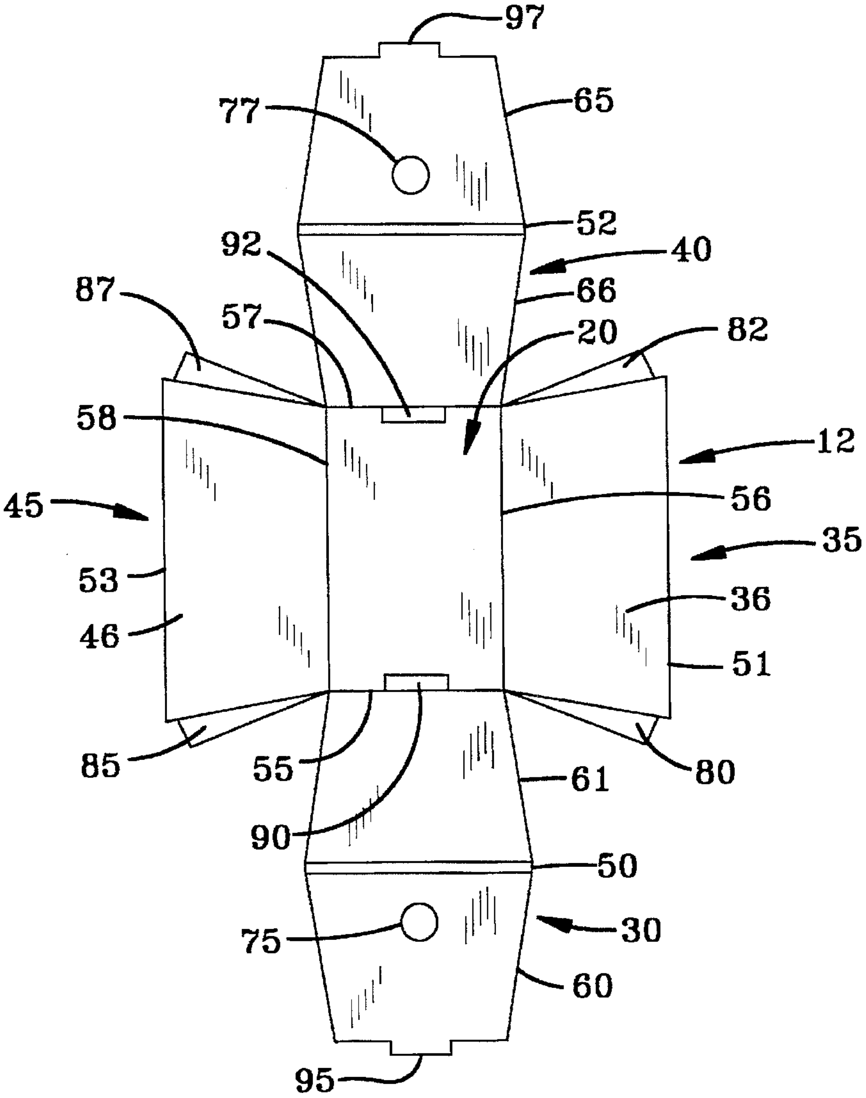
FIG. 7 is a top plan view of the container in its pre-assembled state.
Figure 8:
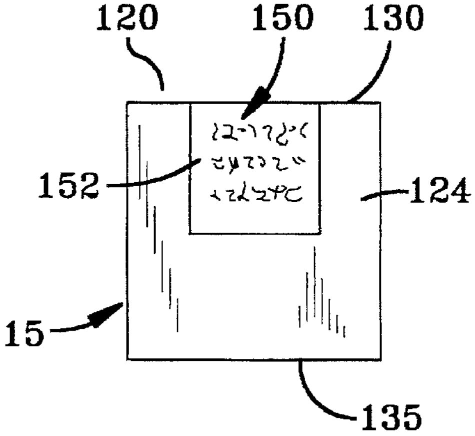
FIG. 8 is a front elevational view of the sleeve.
Figure 9:
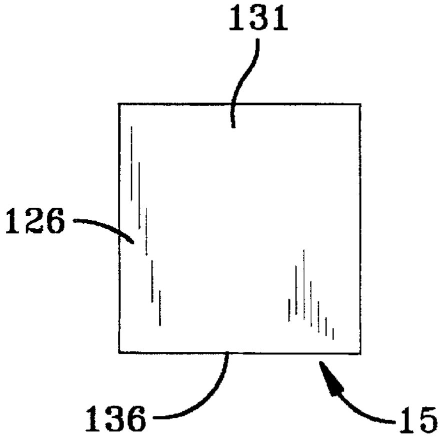
FIG. 9 is a rear elevational view of the sleeve.
Figure 10:
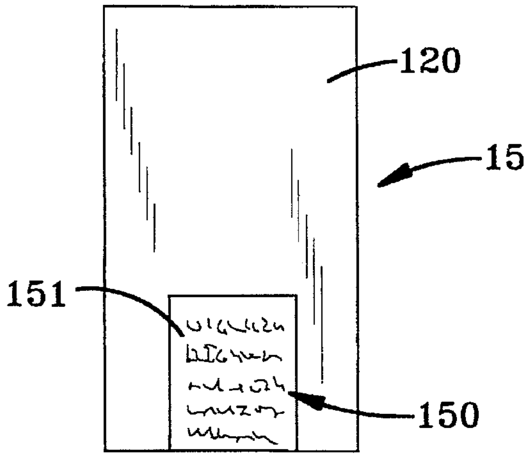
FIG. 10 is a top plan view of the sleeve.
Figure 11:
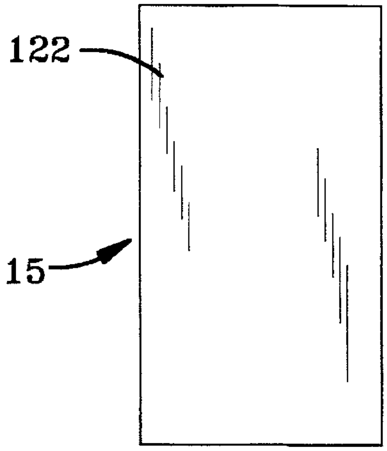
FIG. 11 is a bottom plan view of the sleeve.
Figure 12:
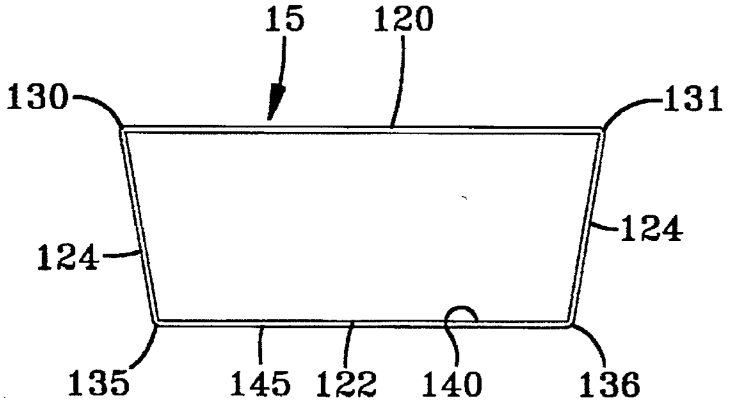
FIG. 12 is a side elevational view of the sleeve.

Comparing FIGS. 2, 5 and 7 it will be also be appreciated that within first sidewall portion 30 and third sidewall portion 40 are formed recessed portions 70, 72 respectively. Recessed portion 70 is formed as the result of the presence of a first sidewall portion aperture 75 in first sidewall first portion 60. Meanwhile, recessed portion 72 is formed as a result of the existence of a third sidewall portion aperture 77 in third sidewall first portion 65.

A comparison of FIGS. 7 and 5 discloses that second sidewall portion 35 features a second sidewall portion flange 80 as well as a second sidewall portion flange 82. Each of the two flanges are at opposite ends of the sidewall portion. Similarly, fourth sidewall portion 45 has fourth sidewall portion flange 85 as well as fourth sidewall portion flange 87. Each of these flanges are also at opposite ends of the fourth sidewall portion. As can best be appreciated from reference to FIG. 7, each of the flanges 80, 82, 85, and 87 are folded inwardly relative to final assembled tray 12 such that when the first and third sidewall portions 30, 40 respectively are folded inwardly, the flanges are retained, as can best be appreciated from FIG. 5, between first sidewall first portion 60 and first sidewall second portion 61, as well as between third sidewall first portion 65 and third sidewall second portion 66. Specifically, flanges 82 and 87 are retained within the third sidewall portion 40, while flanges 80 and 85 are retained within the first sidewall portion 30.

Assisting in the assembly of tray 12 are a base first aperture 90 and a base second aperture 92. These generally oblong slots occur adjacent bottom edges 55, 57 respectively as part of base 20. Each aperture 90, 92 is dimensioned such that first sidewall portion tab 95 and third sidewall portion tab 97 are able to be inserted through the corresponding aperture. Thus, when the tray is assembled as shown in FIGS. 2 or 5, a sturdy paperboard tray exists.

The primary component of the pharmaceutical retaining means 25 is rod 100, preferably formed of a metal such as aluminum or stainless steel. Rod 100 has a first end 102 and a second end 104 as can best be appreciated from FIG. 6. First end 102 has a first end cap 106 fitted thereon. Similarly, second end 104 has a second end cap 108 fitted thereon. In the preferred embodiment of the means for retaining pharmaceuticals, the exterior surface 110 of rod 100 is held in frictional engagement with the respective end caps 106 and 108. This engagement is accomplished through the insertion of the first end 102 of rod 100 through the first end cap aperture 112 and by the insertion of the second end 104 of rod 100 through the second end cap aperture 114.

Figure 6:
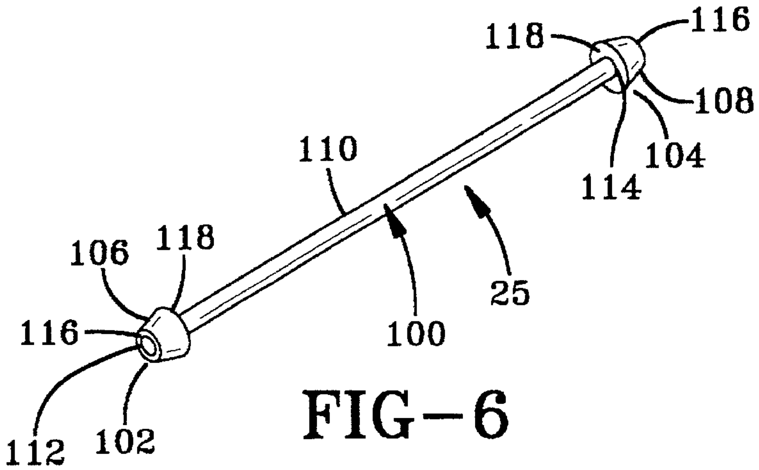
FIG. 6 is a perspective view of a portion of the means for retaining pharmaceuticals associated with the method of this invention.

It will be appreciated from FIG. 6 that each of the end caps 106, 108 are of a fructo-conical configuration. First end cap 106 is for positioning within recessed portion 70 on the first sidewall portion 30. That particular end cap is fixedly secured to rod 100. Meanwhile, the second end cap 108 is designed to be located within the recessed portion 72 of third sidewall portion 40. This can be better appreciated from viewing FIG. 2. Additionally, the second end cap 108 is removable from rod 100.

When assembled, the means for retaining pharmaceuticals 25 has the two end caps 106, 108 oriented on rod 100 so that the outermost end surfaces 116 are of a smaller diameter than the innermost end surfaces 118. This facilitates the insertion of the end caps into the recessed portions 70, 72.

Turning now to the structure associated with sleeve 15, it can be readily appreciated from a comparison of FIGS. 1, 8, 9, 10, 11 and 12 that the sleeve 15 is formed having a top surface 120, a bottom surface 122, and end faces 124 and 126. Preferably each of those surfaces 120, 122, 124 and 126 are rectangular in shape as well as being planar. The two end faces 124 and 126, in addition to preferably having the same dimensions, each have a sleeve end face top edge 130, 131 respectively. Furthermore, each end face 124, 126 has a sleeve end face bottom edge 135, 136 respectively. It will be appreciated that the distance between the end face top edges 130, 131 is greater than the distance between the sleeve end face bottom edges 135, 136. As a result, from the side, the sleeve also exhibits a trapezoidal appearance in the preferred embodiment, as can best be appreciated by FIG. 12.

The sleeve has an interior surface 140 and an exterior surface 145. The dimensioning of the sleeve and tray is such that there is a frictional fit between the two which assist in retaining the tray within the sleeve. For example, in one embodiment the sleeve is 4⅛" tall, 6½" wide, and 18¾" long. Meanwhile, the tray is 4" tall, 6¼" wide, and 18¾" long.

It will also be appreciated from a comparison of FIGS. 1, 2, 8, and 10 that sleeve 15 has affixed thereto a label 150. Label 150 has a label first portion 151 which is located on the top surface 120 of the sleeve and a label second portion 152 located on the one end face 124. Preferably the label first portion includes information such as the lot number and the expiration date of the pharmaceuticals within the container as well as any storage instructions, cautions, or warnings. Meanwhile, the label second portion 152 includes information relative to the type of pharmaceutical in the container.

Also part of the pharmaceutical retaining means 25 are a plurality of packets 155 each of which has a label 156 either thereon or affixed thereto. Preferably each of these packets are fabricated from transparent plastic and have an aperture 158 through which rod 100 passes. These packet apertures 158 are preferably located near the top of each packet so that the remainder of the packet hangs down into the interior of the tray. For assistance in the distribution of the pharmaceuticals contained within each of the containers associated with the invention, a divider 160 preferably a colored paperboard card is sometimes placed on the rod 100 so as to designate packets in groups of a predetermined number, preferably ten.

The tray shown in FIG. 7 is assembled into the tray shown in FIG. 5. Thereafter the pharmaceutical retaining means is secured within the tray with the packets of pharmaceuticals retained thereon as shown in FIG. 2. The tray is then inserted within the sleeve such that the sleeve encases the tray. This results in a pharmaceutical distribution container which can then be advantageously utilized in a drug retrieval system, which system may be robotic. When the tray is empty, the empty trays are nestable, which permits them to be stored in as little space as possible. Additionally, the tray as well as the rod, including its end caps are reusable. The relatively small number of pharmaceuticals associated with each container permit greater economic control to be exercised over inventory. Also sub-dividing the packets into groups of a predetermined number, such as ten, reduces the time and cost associated with the reloading process.

Once the pharmaceutical needing to be restocked has been identified as to its name and the number needed for restocking, in actual practice, the method of this invention facilitates tje distribution of pharmaceuticals with a patient's tray through a stocking process that is easy and cost effective. This is generally provided by a computerized inventory control system that provides the number of unit doses associated with a particular pharmaceutical that have been dispensed since the last restocking of that particular pharmaceutical.

Once that determination has been made, then a pharmaceutical distribution container of the type set forth above is selected, with that container having stored therein the particular pharmaceutical required for the restocking. When selected, the container has the sleeve encasing the tray.

Thereafter, the tray is removed from the sleeve so as to expose the rod, end caps, and unit dose packet(s). The rod is then removed from the recessed portions of the tray. The removable second end cap is then slid off the rod and the rod is placed over the peg on the reloading cart. This peg is of the type already in use in automated pharmacy systems, and the rod is hollow and of sufficient diameter to slidably fit thereover. The number of packets needed to complete the restocking are then preferably slid off the rear of the rod and onto the peg of the reloading cart. The rod is then removed from the peg and the rod's end cap replaced, thus preventing packets from sliding off the rod. Finally, the rod is again placed into the tray such that the two ends engage with the recessed portions of the two sidewall portions, and the tray preferably inserted into the sleeve. Use of this method permits the information on the label of the front of the packets to be scanned by the robot as it subsequently selects packets from the restocking cart for transfer to the pegs on the wall.

While the method herein described constitutes a preferred embodiment of the invention, it is to be understood that the invention is not limited to this precise method, and that changes may be made therein without departing from the scope of the invention which is defined in the appended claims.

What is claimed is:

1. A method for assisting in the dispensing of pharmaceuticals, said method comprising the steps of:

selecting a pharmaceutical distribution container corresponding to the pharmaceutical needing to be restocked, said container comprising a tray and a sleeve which encases said tray, said tray comprising a base, a sidewall, said sidewall having two recessed portions formed therein, means for retaining pharmaceuticals within said tray, said means for retaining pharmaceuticals within said tray comprising a rod, said rod having a first and a second end, and packets containing one each of the pharmaceutical need to be restocked, each of said packets having an aperture formed therethrough, said sleeve comprising a top surface, a bottom surface, and two end faces, removing said tray from said sleeve, removing said rod from said tray, and transferring a predetermined number of packets from said rod so they can be restocked.

2. The method according to claim 1 wherein said sidewall comprises a first sidewall portion, a second sidewall portion, a third sidewall portion, and a fourth sidewall portion, said first and third sidewall portions having the same dimensions, and said second and fourth sidewall portions having the same dimensions, said rod being capable of being secured between said first sidewall portion and said third sidewall portion.

3. The method according to claim 2 wherein each of said first, second, third, and a fourth sidewall portions is of a trapezoidal shape.

4. The method according to claim 2 wherein each of the first, second, third and fourth sidewall portions have a top edge and a bottom edge with the distance between said first sidewall portion top edge and said third sidewall portion top edge being greater than the distance between said first sidewall portion bottom edge and said third sidewall portion bottom edge.

5. The method according to claim 4 wherein each of the first, second, third, and fourth sidewall portions have a top edge and a bottom edge with the distance between said second sidewall portion top edge and said fourth sidewall portion top edge being greater than the distance between said second sidewall portion bottom edge and said fourth sidewall portion bottom edge.

6. The method according to claim 1 wherein said end faces of said sleeve each have a top edge and a bottom edge with the distance between the top edge of each of said end faces being greater than the distance between the bottom edge of each of said end faces.

7. The method according to claim 1 which includes the additional step of replacing said rod in said tray following the removal from said rod of said predetermined number of packets.

8. The method according to claim 1 wherein the first end of said rod has a first end cap and the second end of said rod has a second end cap.

9. The method according to claim 8 wherein said first end cap rests in the recessed portion of said first sidewall portion and said second end cap rests in the recessed portion of said third sidewall portion, said first end cap being fixedly secured to said rod and said second end cap being detachably secured to said rod.

10. The method according to claim 9 which includes the additional step of removing said second end cap prior to removal from said rod of said predetermined number of packets.

11. The method according to claim 10 which includes the additional steps following the removal from said rod of said predetermined number of packets of replacing said second end cap on said rod and replacing said rod in said tray.

12. The method according to claim 1 which includes the additional step of replacing said tray within said sleeve.

13. The method according to claim 1 wherein said packets are arranged in groups of a predetermined number with dividers placed between each group.

14. A method for assisting in the dispensing of pharmaceuticals, said method comprising the steps of:

selecting a pharmaceutical distribution container corresponding to the pharmaceutical needing to be restocked, said container comprising a base, a sidewall, and means for retaining pharmaceuticals within said container, said sidewall comprising a first sidewall portion, a second sidewall portion, a third sidewall portion, and a fourth sidewall portion, said means for retaining pharmaceuticals within said tray comprising a rod, said rod secured between said first sidewall portion and said third sidewall portion, removing said tray from said sleeve, removing said rod from said tray, and transferring a predetermined number of packets from said rod so they can be restocked.

15. The method according to claim 14 wherein said first sidewall portion and said third sidewall portion each have a recessed portion formed therein, said rod having a first and a second end, said first end resting in said first sidewall portion recessed portion and said second end resting in said third sidewall portion recessed portion.

16. The container according to claim 14 wherein at least a portion of the thickness of each of said first and third sidewall portions is greater than the thickness of each of said second and fourth sidewall portions.

17. The container according to claim 15 wherein at least a portion of the thickness of each of said first and third sidewall portions is greater than the thickness of each of said second and fourth sidewall portions.

* * * * *